US007637249B2

(12) United States Patent
Yamamura et al.

(10) Patent No.: US 7,637,249 B2
(45) Date of Patent: Dec. 29, 2009

(54) FUEL INJECTION CONTROL DEVICE FOR INTERNAL COMBUSTION ENGINE

(75) Inventors: Yoshiya Yamamura, Kariya (JP); Yoshiyasu Ito, Toyota (JP)

(73) Assignees: Kabushiki Kaisha Toyota Jidoshokki, Kariya-shi (JP); Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 12/299,403

(22) PCT Filed: Nov. 20, 2007

(86) PCT No.: PCT/JP2007/072429

§ 371 (c)(1), (2), (4) Date: Nov. 3, 2008

(87) PCT Pub. No.: WO2008/062774

PCT Pub. Date: May 29, 2008

(65) Prior Publication Data

US 2009/0076714 A1 Mar. 19, 2009

(30) Foreign Application Priority Data

Nov. 20, 2006 (JP) ............................ 2006-313130

(51) Int. Cl.
*F02P 5/00* (2006.01)
*B60T 7/12* (2006.01)

(52) U.S. Cl. ........................... 123/406.58; 123/406.59; 123/494; 701/105

(58) Field of Classification Search ............ 123/406.58, 123/406.59, 406.6, 406.64, 406.65, 494, 123/478, 480; 701/103, 105
See application file for complete search history.

(56) References Cited

U.S. PATENT DOCUMENTS 4,574,756 A * 3/1986 Ito et al. .................... 123/357
4,887,215 A * 12/1989 Kumagai et al. ............ 701/102

(Continued)

FOREIGN PATENT DOCUMENTS

JP 8-254138 10/1996

(Continued)

*Primary Examiner*—John T Kwon
(74) *Attorney, Agent, or Firm*—Locke Lord Bissell & Liddell, LLP

(57) ABSTRACT

A fuel injection control apparatus is provided with a fuel injection nozzle, a crank angle detector, a timer, and a control computer. The crank angle detector outputs a pulse signal corresponding to each tooth portion of a signal rotor and a pulse signal corresponding to a tooth missing portion. The control computer sets, as a fuel injection timing, a point of time at which a predetermined standby time period has elapsed from a point of time at which a reference tooth portion is detected. The control computer recognizes a tooth missing zone based on the pulse signal corresponding to the tooth missing portion. The control computer determines whether the fuel injection timing is set in a specific section in the tooth missing zone. When the fuel injection timing is set in a section outside the specific section, the control computer sets, as the predetermined standby time period, a remaining time period shorter than one inter-signal time period. In contrast, when the fuel injection timing is set to the specific section, the control computer sets, as the predetermined standby time period, a time period obtained by adding one or more inter-signal time periods to the remaining time period.

5 Claims, 9 Drawing Sheets

U.S. PATENT DOCUMENTS

| | | | | | |
|---|---|---|---|---|---|
| 5,353,635 | A * | 10/1994 | Saiki et al. | 73/114.27 |
| 6,035,826 | A * | 3/2000 | Matsuoka | 123/406.62 |
| 7,527,039 | B2 * | 5/2009 | Yamamura et al. | 123/476 |
| 2007/0034177 | A1 | 2/2007 | Yoshizaki | 123/54.7 |

FOREIGN PATENT DOCUMENTS

| | | |
|---|---|---|
| JP | 2000-240489 | 9/2000 |
| JP | 2002-276453 | 9/2002 |
| JP | 2002-303199 | 10/2002 |
| JP | 2003-314338 | 11/2003 |
| JP | 2005-315107 | 11/2005 |

* cited by examiner

FUEL INJECTION CONTROL DEVICE FOR INTERNAL COMBUSTION ENGINE

FIELD OF THE INVENTION

The present invention relates to a fuel injection control apparatus in an internal combustion engine, the fuel injection control apparatus including a fuel injection device for injecting fuel to be burned in a cylinder of the internal combustion engine and a control unit for controlling the timing of injecting the fuel from the fuel injection device.

BACKGROUND OF THE INVENTION

Patent Document 1 discloses a crank angle detector for detecting a rotational angle of a crankshaft of an internal combustion engine, i.e., a crank angle. The crank angle detector includes: a toothed rotor, i.e., a signal rotor, which is attached to a crankshaft and is made of a magnetic material; and a magnet pickup coil. Along a circumference of the signal rotor, a plurality of tooth portions are arranged with uniform angular spacing. Also, at one portion of the circumference of the signal rotor, a tooth missing portion formed removing tooth portions. The tooth missing portion is used for detecting a reference position of the crank angle.

Generally, fuel injection timing (injection start timing and injection end timing) is first set as crank angles. Subsequently, based on the crank angle, a tooth portion serving as a reference (a reference tooth portion) is set. Also, a standby period until a point in time at which the fuel injection is started or ended after a detection signal corresponding to the reference tooth portion is detected is determined. When fuel injection control is executed, the reference tooth portion is detected by the magnet pickup coil. Thereafter, at a point in time at which a lapse of the standby period is determined through measurement by a timer, the fuel injection is started or ended.

The above-described standby period changes according to a rotational speed of the crankshaft. More specifically, from a duration between two detection signals respectively corresponding to any two adjacent tooth portions before the reference tooth portion, the rotational speed of the crankshaft is obtained. The obtained rotational speed is regarded as the present rotational speed of the crankshaft. In this way, the standby period in which the reference tooth portion is used as a point of origin is determined. When the duration between the detection signals corresponding to any two adjacent tooth portions is short, the obtained rotational speed of the crankshaft is fast, and thus, the standby period in which the reference tooth portion is used as the point of origin is also short.

In an 8-cylinder internal combustion engine as disclosed in Patent Document 1 and Patent Document 2, an interval between a previous fuel injection timing and the current fuel injection timing is equivalent to 90° in a crank angle. On the other hand, for example, in a case of a 4-cylinder internal combustion engine of which the number of cylinders is relatively small, the interval between the previous fuel injection timing and the current fuel injection timing corresponds to a crank angle of about 180°. Therefore, the engine of which the number of cylinders is greater has a shorter fuel injection interval. Recently, the number of internal combustion engines in which a pilot injection is performed before a main fuel injection or a post injection is performed after the main injection has been increasing. When the pilot injection or the post injection is performed in an engine of which the number of cylinders is relatively large, the fuel injection interval becomes very short. Thus, when the fuel injection timing is set according to the above-described method, the detection signal corresponding to the tooth missing portion may need to be used when the standby period serving a basis for calculating the injection timing is obtained.

However, the tooth missing portion is arranged over a zone in which a plurality of pieces of normal tooth portions can be located, and thus, in a detection zone of the tooth missing portions, the fuel injection timing needs to be set in a manner different from that of the detection zone of the normal tooth portions.

Patent Document 1: Japanese Laid-Open Patent Publication No. 2002-303199

Patent Document 2: Japanese Laid-Open Patent Publication No. 2005-315107

SUMMARY OF THE INVENTION

An objective of the present invention is to enable an appropriate calculation of fuel injection timing using a signal rotor having a tooth missing portion.

To achieve the above-described object, in one aspect of the present invention, a fuel injection control apparatus in an internal combustion engine having a plurality of cylinders is provided. The fuel injection control apparatus is provided with a fuel injection device, a crank angle detector, a timer, and a control unit. The fuel injection device injects fuel into the cylinders. The crank angle detector includes a signal rotor, the signal rotor having: a plurality of tooth portions aligned along a circumferential direction with constant angular spacing; and a tooth missing portion arranged over an angular range larger than alignment spacing of the tooth portions. The crank angle detector, in accordance with a rotation of the signal rotor, outputs a signal corresponding to the each tooth portion and a signal corresponding to the tooth missing portion. The timer measures an inter-signal time period, which is a time period from when the crank angle detector outputs the signal corresponding to the tooth portion to when the crank angle detector outputs a signal corresponding to a subsequent tooth portion. The control unit uses the signal outputted from the crank angle detector to obtain a fuel injection timing, and according to the obtained fuel injection timing, causes the fuel injection device to start a fuel injection. The control unit defines a reference tooth portion out of the tooth portions and the tooth missing portion, and sets, as the fuel injection timing, a point of time at which a predetermined standby time period has elapsed from a point of time at which the reference tooth portion is detected. The control unit recognizes a tooth missing zone based on the signal corresponding to the tooth missing portion and determines whether the fuel injection timing is set in a specific section that is the tooth missing zone other than a head section. When the fuel injection timing is set in a section outside the specific section, the control unit sets, as the predetermined standby time period, a remaining time period shorter than one inter-signal time period. When the fuel injection timing is set in the specific section, the control unit sets, as the predetermined standby time, a time period obtained by adding one or more inter-signal time periods to the remaining time period.

BRIEF DESCRIPTION OF THE DRAWINGS

FIG. 1(*b*) is a cross-sectional side view of the internal combustion engine in FIG. 1(*a*);

FIG. 2(*b*) is a timing chart showing a waveform obtained from a signal outputted from the crank angle detector in FIG. 2(*a*);

FIG. 2(*c*) is a timing chart showing relevant parts in FIG. 2(*b*);

DETAILED DESCRIPTION OF THE PREFERRED EMBODIMENTS

Figure 1:
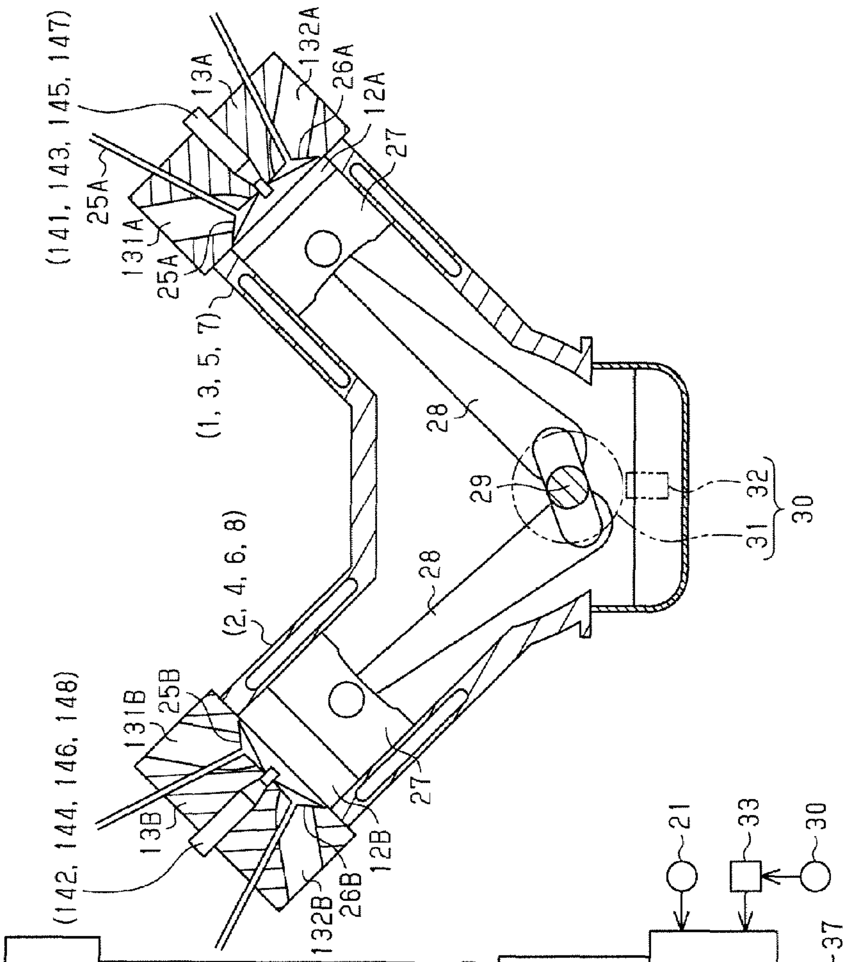
FIG. 1(*a*) is a simplified view of an internal combustion engine according to a first embodiment of the present invention.
Figure 1:
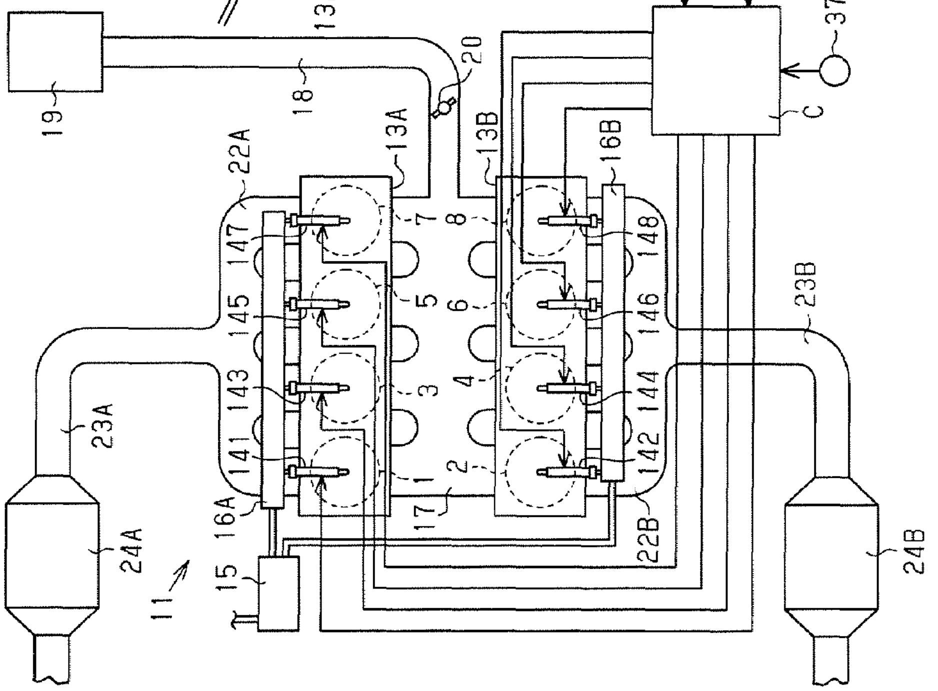

Hereinafter, with reference to FIGS. 1A to 5, a first embodiment according to the present invention will be described.

As shown in FIG. 1A, a diesel engine 11 mounted on a vehicle is provided with a plurality of cylinders 1, 2, 3, 4, 5, 6, 7, and 8. The engine 11 is a V-type 8-cylinder 4-cycle engine. The cylinders 1, 3, 5, and 7 configure a first cylinder group, and the cylinders 2, 4, 6, and 8 configure a second cylinder group. Fuel injection nozzles 141, 143, 145, and 147, which correspond to the cylinders 1, 3, 5, and 7, respectively, are attached to a cylinder head 13A corresponding to the first cylinder group. Fuel injection nozzles 142, 144, 146, and 148, which correspond to the cylinders 2, 4, 6, and 8, respectively, are attached to a cylinder head 13B corresponding to the second cylinder group. By way of a fuel pump 15 and common rails 16A and 16B, fuel is supplied to the fuel injection nozzles 141 to 148. The fuel injection nozzles 141 to 148 inject the fuel into the corresponding cylinders 1 to 8. The fuel pump 15, the common rails 16A and 16B, and the fuel injection nozzles 141 to 148 configure a fuel injection device for injecting the fuel into a plurality of cylinders of an internal combustion engine.

Both cylinder heads 13A and 13B are connected to an intake manifold 17. The intake manifold 17 is connected to an intake passage 18. The intake passage 18 is connected to an air cleaner 19. A throttle valve 20 is arranged in the intake passage 18. The throttle valve 20 regulates a flow rate of air drawn into the intake passage 18 via the air cleaner 19. An opening degree of the throttle valve 20 is regulated corresponding to an operation of an accelerator pedal not shown. A depression degree of the accelerator pedal is detected by a pedal depression degree detector 21.

Both cylinder heads 13A and 13B are connected to exhaust manifolds 22A and 22B, respectively. The exhaust manifold 22A is connected to an exhaust passage 23A. The exhaust manifold 22B is connected to an exhaust passage 23B. The exhaust passage 23A has an exhaust purification apparatus 24A. The exhaust passage 23B has an exhaust purification apparatus 24B. The exhaust purification apparatuses 24A and 24B have a NOx catalyst, for example. Exhaust gas discharged from the cylinders 1, 3, 5, and 7 is released to the atmospheric air via the exhaust manifold 22A, the exhaust passage 23A, and the exhaust purification apparatus 24A. Exhaust gas discharged from the cylinders 2, 4, 6, and 8 is released to the atmospheric air via the exhaust manifold 22B, the exhaust passage 23B, and the exhaust purification apparatus 24B.

As shown in FIG. 1(*b*), the cylinder head 13A is formed with an intake port 131A and an exhaust port 132A in a manner to correspond to the respective cylinders 1, 3, 5, and 7. The cylinder head 13B is formed with an intake port 131B and an exhaust port 132B in a manner to correspond to the respective cylinders 2, 4, 6, and 8. The intake ports 131A and 131B each have a first end connected to combustion chambers 12A and 12B within the corresponding cylinders 1 to 8, and a second end connected to a corresponding branch pipe of the intake manifold 17. Each exhaust port 132A has a first end connected to the corresponding combustion chamber 12A and a second end connected to a corresponding branch pipe of the exhaust manifold 22A. Each exhaust port 132B has a first end connected to the corresponding combustion chamber 12B and a second end connected to a corresponding branch pipe of the exhaust manifold 22B.

Each intake port 131A is selectively opened and closed by a corresponding intake valve 25A, and each intake port 131B is selectively opened and closed by a corresponding intake valve 25B. Each exhaust port 132A is selectively opened and closed by a corresponding exhaust valve 26A, and each exhaust port 132B is selectively opened and closed by a corresponding exhaust valve 26B. Pistons 27 defining the combustion chambers 12A and 12B within the cylinders 1 to 8 are coupled to a crankshaft 29 with connecting rods 28. A reciprocating movement of the pistons 27 is converted into a rotational motion of the crankshaft 29 through the connecting rods 28. A rotational angle, i.e., a crank angle, of the crankshaft 29 is detected by a crank angle detector 30.

Figures 2A, 2B, 2C:
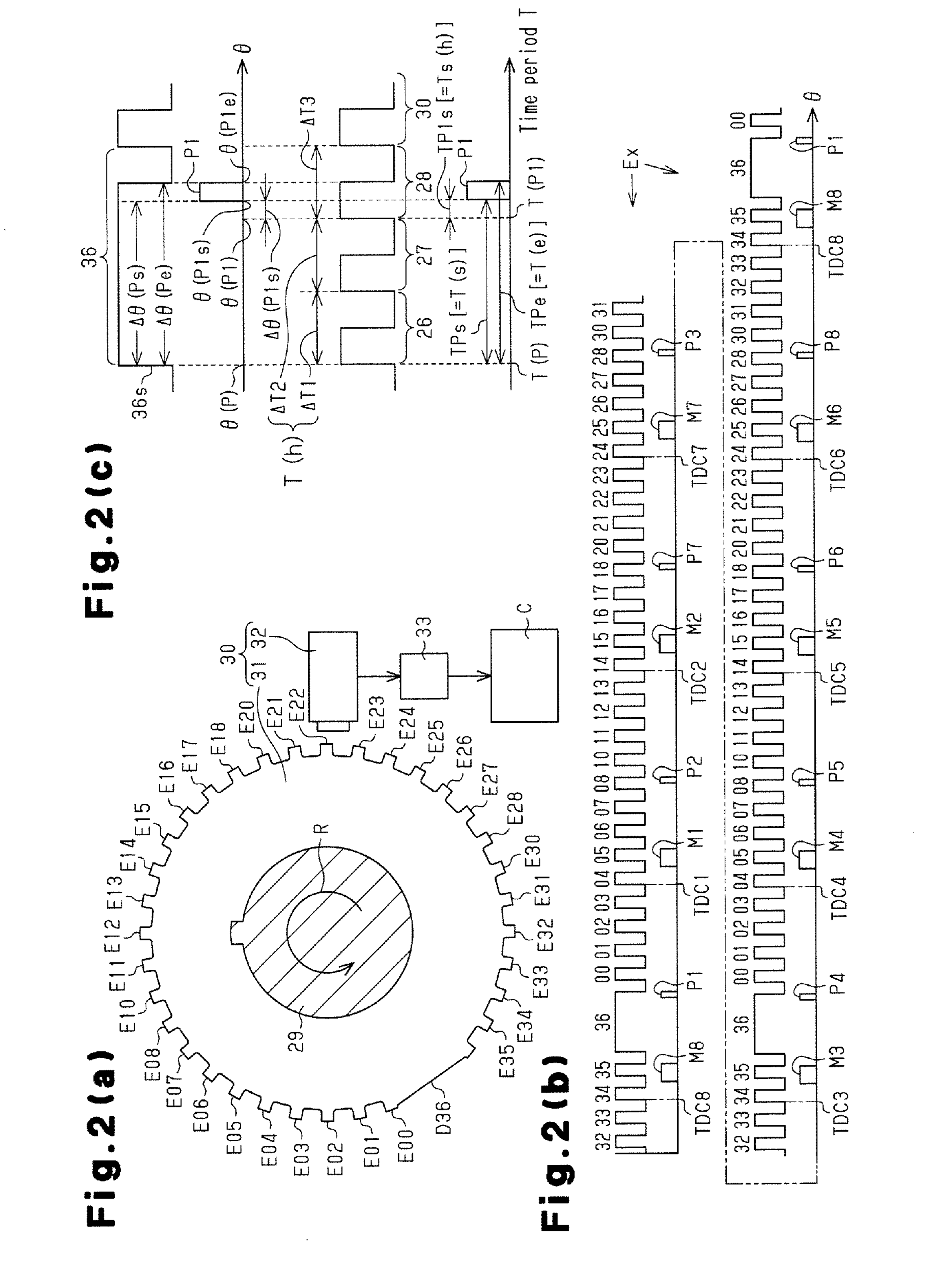
FIG. 2(*a*) is a simplified view of a crank angle detector arranged in the engine in FIG. 1(*b*)

As shown in FIG. 2(*a*), the crank angle detector 30 includes a signal rotor 31 fixed to the crankshaft 29 and an electromagnetic induction-type pickup coil 32. The signal rotor 31 is rotated in a direction of arrow R integrally with the crankshaft 29. Along a circumferential edge of the signal rotor 31, a plurality of tooth portions E00 to E08, E10 to E18, E20 to E28, and E30 to E35 are aligned successively along a circumferential direction with constant angular spacing. Along the circumferential edge of the signal rotor 31, a tooth missing portion D36 is arranged to extend over an angular range larger than an alignment spacing of the tooth portions. The pickup coil 32 outputs a voltage signal in accordance with a rotation of the signal rotor 31. The voltage signal outputted from the pickup coil 32 is sent to a waveform shaping section 33. The waveform shaping section 33 shapes the voltage signal sent from the pickup coil 32 in a pulse-shaped waveform Ex (see FIG. 2B) and outputs it to a control computer C.

FIG. 2(*b*) shows a pulse-shaped waveform Ex outputted from the waveform shaping section 33 when the signal rotor 31 performs two or more rotations. A horizontal axis θ shows the crank angle. TDC1 to TDC8 represent crank angles when the piston 27 of each cylinder 1 to 8 is at the top dead center position in a compression stroke. In the present embodiment, fuel is supplied in the order of cylinders 1, 2, 7, 3, 4, 5, 6, and 8.

Pulse signals (first signals) 00 to 08 correspond to detection of the tooth portions E00 to E08, respectively. Pulse signals (first signals) 10 to 18 correspond to detection of the tooth portions E10 to E18, respectively. Pulse signals (first signals) 20 to 28 correspond to detection of the tooth portions E20 to E28, respectively. Pulse signals (first signals) 30 to 35 correspond to detection of the tooth portions E30 to E35, respectively. A pulse signal (second signal) 36 corresponds to detection of the tooth missing portion D36.

Reference numerals M1 to M8 denote a period of a main injection of fuel from the fuel injection nozzles 141 to 148 in the cylinders 1 to 8, respectively.

Reference numerals P1 to P8 denote a period of a pilot injection of the fuel from the fuel injection nozzles 141 to 148 in the cylinders 1 to 8, respectively.

The depression degree information obtained by the pedal depression degree detector 21, and crank angle information obtained by the crank angle detector 30 are sent to the control computer C. The control computer C calculates a fuel injection timing (an injection start timing and an injection end timing) in the fuel injection nozzles 141 to 148 based on a parameter, which indicates an engine operating condition, such as the depression degree information and the crank angle information.

As shown in FIG. 1(*a*), the control computer C is connected to a timer 37. Time-period measurement information obtained by the timer 37 is sent to the control computer C.

Figure 4:
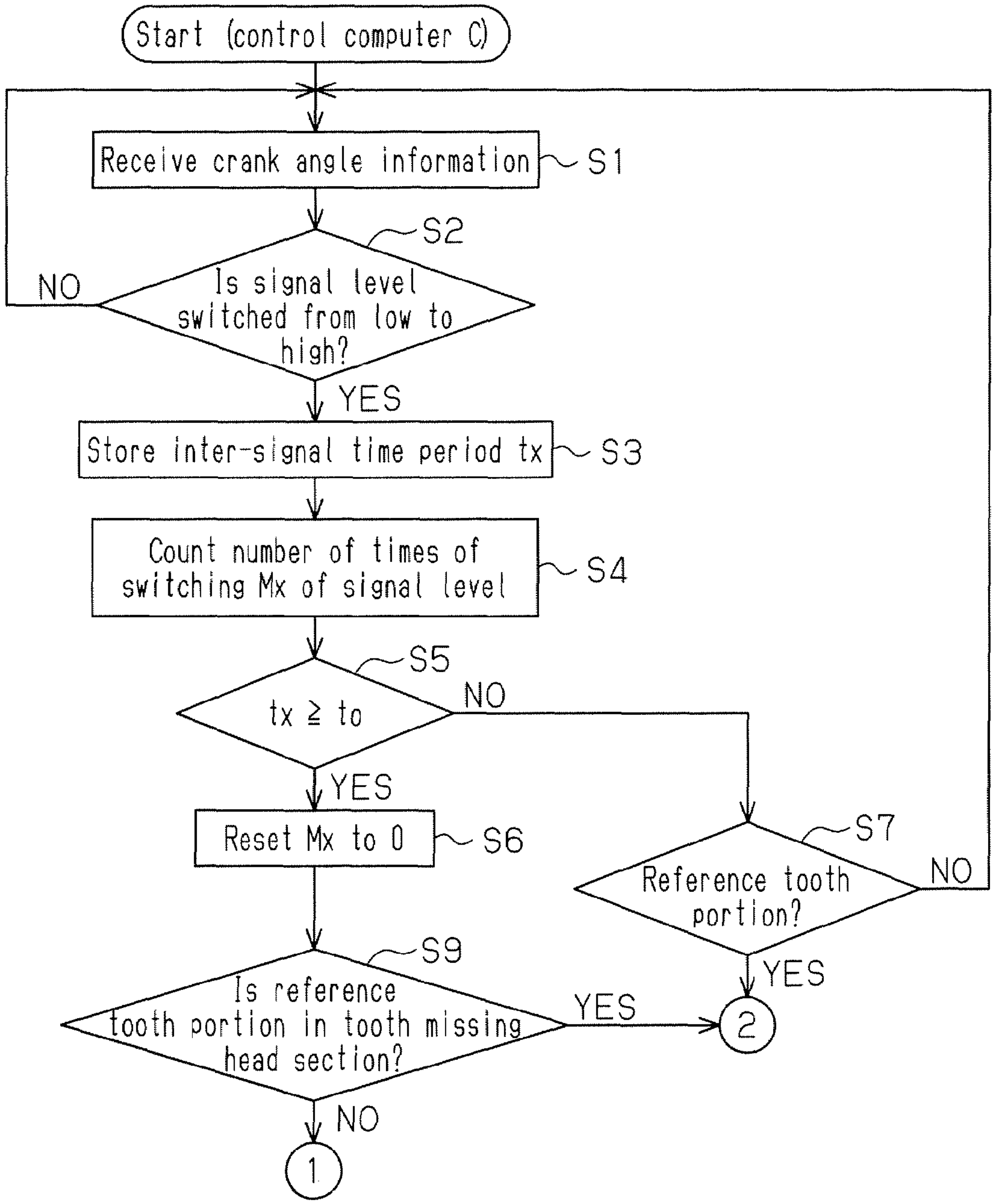
FIG. 4 is a flowchart showing a fuel injection control procedure according to the first embodiment.
Figure 5:
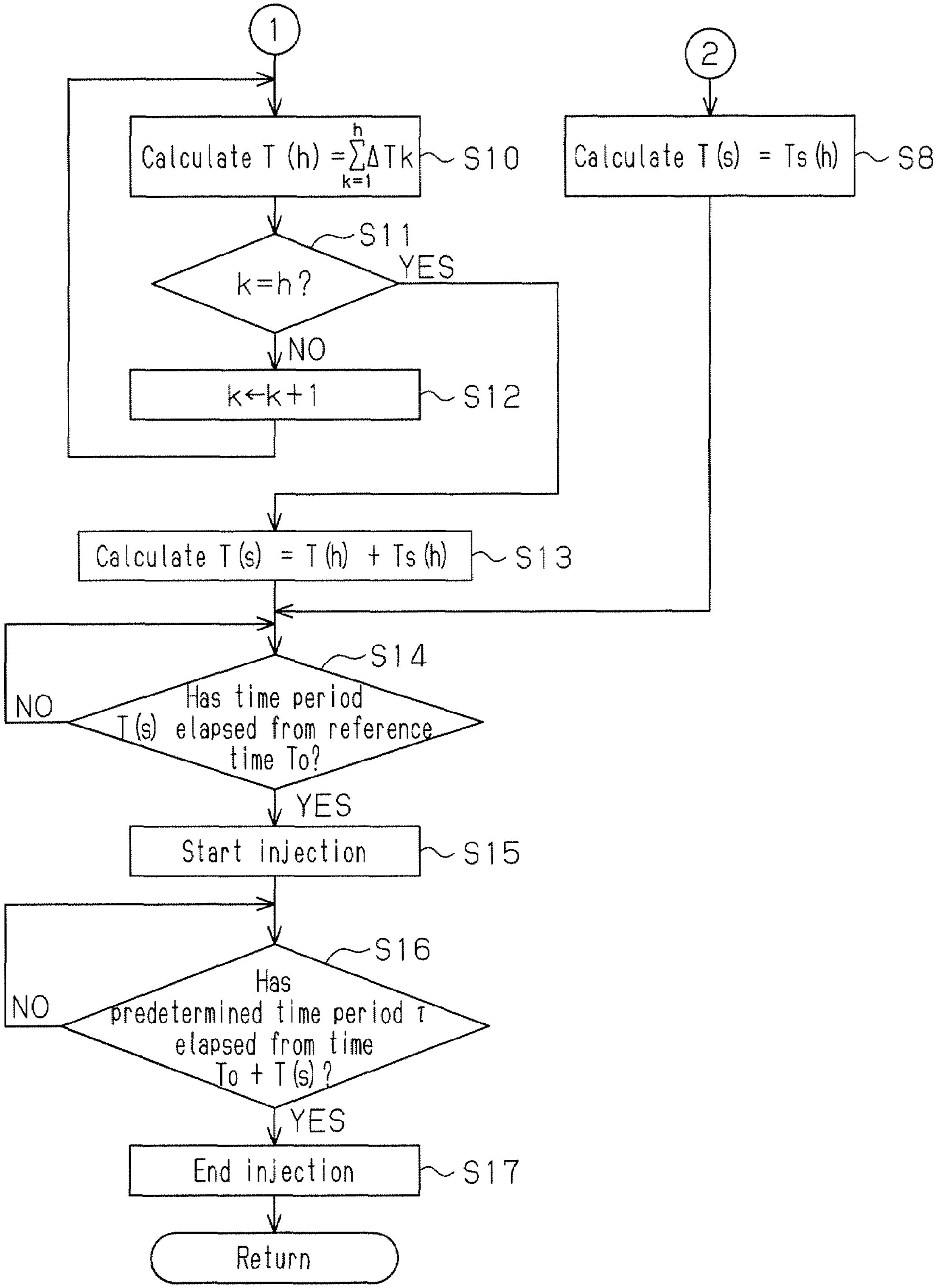
FIG. 5 is a flowchart showing the fuel injection control procedure according to the first embodiment.

FIGS. 4 and 5 are flowcharts representing a fuel injection control procedure. Hereinafter, the fuel injection control is described according to these flowcharts.

As shown in FIG. 4, at step S1, the control computer C receives the crank angle information, i.e., the voltage signal indicated by the waveform Ex, for each predetermined control cycle, and stores the information. At step S2, the control computer C determines whether the level of the voltage signal has been switched from a low level to a high level (whether a waveform signal has risen). When the signal level is not switched from a low level to a high level at step S2, the control computer C proceeds to step S1.

When the signal level is switched from a low level to a high level at step S2, the control computer C proceeds to step S3 to store a time period elapsed between the previous switching of the signal level and the current switching of the signal level, i.e., an inter-signal time period tx. The inter-signal time period tx is obtained as a result of the timer 37 measuring a duration from when the crank angle detector 30 outputs a signal corresponding to a tooth portion until the crank angle detector 30 outputs a signal corresponding to a subsequent tooth portion. Based on the inter-signal time period tx, the rotational speed of the crankshaft 29 can be obtained. In the description, "switching of the signal levels" means switching of the signal levels from a low level to a high level, unless otherwise described. Subsequently, at step S4, the control computer C counts the number of times of switching (count number) Mx of the signal level. The number of times of switching Mx, which is described below, is counted by regarding a rising of the pulse signal 01 as a first switching.

At step S5, the control computer C determines whether the tooth missing portion D36 has been detected. Specifically, the control computer C determines whether the inter-signal time period tx between the previous switching of the signal level and the current switching of the signal level is equal to or more than a predetermined time period "to". Also, the predetermined time period "to" is greater than a time period between the two pulse signals corresponding to adjacent normal tooth portions. The predetermined time period "to" is a primary variable varied by the rotational speed of the engine.

When the tooth missing portion D36 is not detected, that is, when the inter-signal time period tx is smaller than the predetermined time period "to", the control computer C proceeds to step S7. At step S7, the control computer C determines whether the count number Mx corresponds to a reference tooth portion. In an example of FIG. 2(*b*), the tooth portions E04, E08, E14, E18, E24, E28, and E34 corresponding to the pulse signals 04, 08, 14, 18, 24, 28, and 34, respectively, are defined as the reference tooth portions.

When the count number Mx does not correspond to the reference tooth portion, that is, when the reference tooth portion is not detected, the control computer C proceeds to step S1. In contrast, when the count number Mx corresponds to the reference tooth portion, that is, when the reference tooth portion is detected, the control computer C proceeds to step S8 in FIG. 5 and uses tooth-portion detection information and inter-signal time period detection information of the previous injection cycle to calculate an injection start standby time period, i.e., T(s)=Ts(h). In an example of FIG. 2(*c*), Ts(h), which is a remaining time shorter than one inter-signal time period tx, is TP1*s*. TP1*s* is a value in which Δθ (P1*s*) is represented in time units.

The reference tooth portion, which is described in detail below, is a tooth portion serving as a reference when the fuel injection start timing and the fuel injection end timing are set. That is, according to a fuel injection timing determining procedure separately executed from a routine in FIGS. 4 and 5, a fuel injection timing (the injection start timing and the injection end timing) in each cylinder is obtained as the crank angle based on an operating condition of the engine. The crank angle is converted into a standby time period in which a point of time at which the reference tooth portion is detected is used as the point of origin. Accordingly, when the standby time period has elapsed after the reference tooth portion is detected, the fuel injection is started or ended.

The reference tooth portion is set as a u-th tooth portion (u is a positive integer) in the tooth portion detection information of the injection cycle corresponding to an m-th cylinder (m is a positive integer). The m-th cylinder is a cylinder of which the main injection is the m-th one when counted from the main injection in the cylinder 1. For example, a first tooth portion in the injection cycle corresponding to a first cylinder (the cylinder 1 in the present embodiment) is a tooth portion 04, and an eighth tooth portion in the injection cycle corresponding to a second cylinder (the cylinder 2 in the present embodiment) is a tooth portion 22. Third to fifth tooth portions in the injection cycle corresponding to an eighth cylinder (the cylinder 8 in the present embodiment) is the tooth missing portion. In the injection cycle corresponding to the cylinder 8, i.e., the eighth cylinder, a section between the third tooth portion and the fourth tooth portion is defined as a tooth missing head section; a section between the fourth tooth portion and the fifth tooth portion is defined as a tooth missing central section; and a section between the fifth tooth portion and the sixth tooth portion 00 is defined as a tooth missing ending section. The third to fifth tooth portions in the injection cycle corresponding to the cylinder 8, i.e., the eighth cylinder, do not actually exist, but are those when normal tooth portions are supposed to be located in the tooth missing portion.

Figure 3:
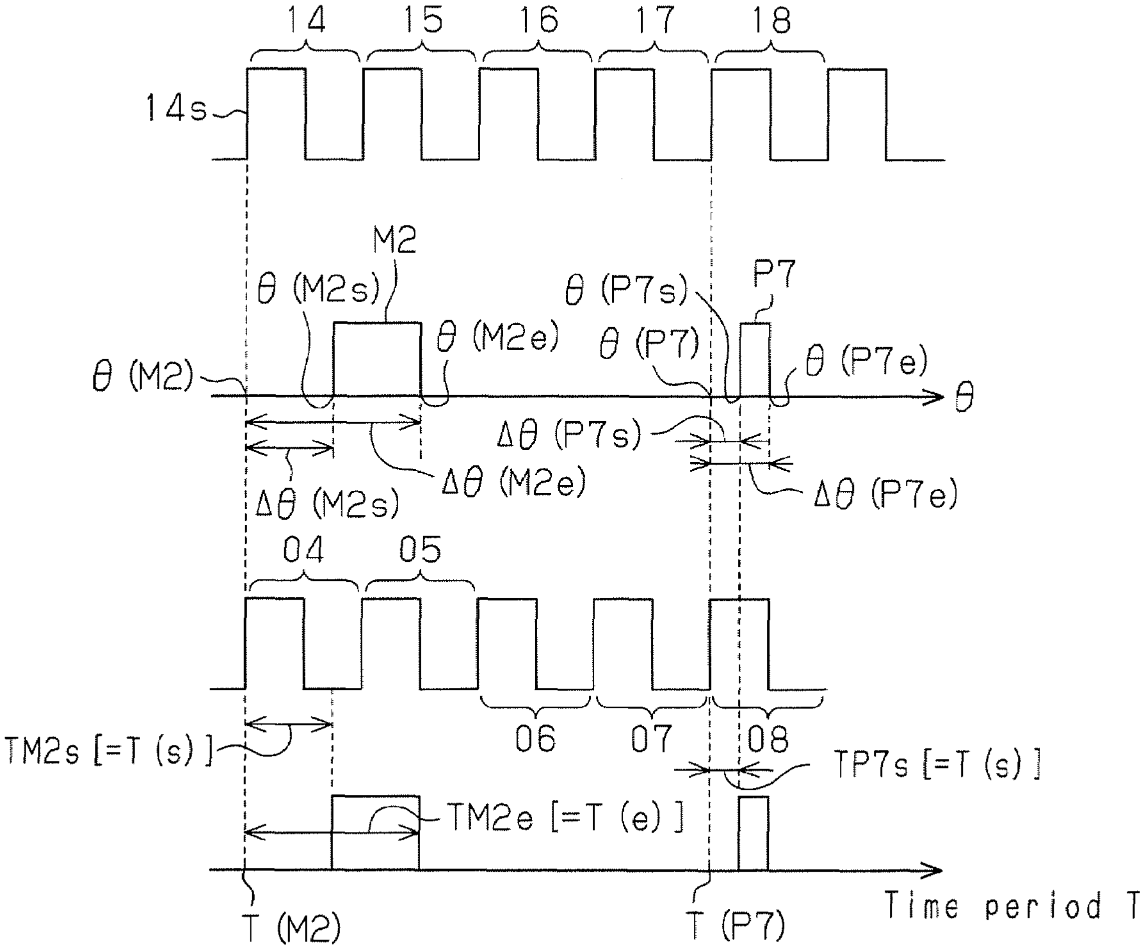
FIG. 3 is a timing chart showing the relevant parts in FIG. 2(*b*)

In an example in FIG. 3, TM2*s* or TP7*s* is shown as an injection start standby period T(s), and TM2*e* or TP7*e* is shown as an injection end standby period T(e). When the crank angle when the piston 27 is at the top dead center position in the compression stroke serves as a reference point, the injection cycle corresponds to a crank angle which corresponds to one rotation of the crankshaft 29, i.e., an angular range (90 degrees in the present embodiment) obtained by dividing 360° by half the number of all cylinders (8 in the present embodiment). That is, the injection cycle is equivalent to the angular range between TDCj (j is an integer of 1 to 8) adjacent to each other. For example, in FIG. 2(*b*), an angular range between a crank angle TDC8 when the cylinder 8 is at the top dead center in the compression stroke and a crank angle TDC1 when the cylinder 1 is at the top dead center in the compression stroke is equivalent to one injection cycle. The tooth portion detection information of the previous injection cycle (the injection cycle one before the injection cycle corresponding to the current injection timing) is a past signal obtained in the previous injection cycle.

In the example in FIG. 3, when the crank angle θ is θ (M2*s*), a main injection to the cylinder 2 is started, and when the crank angle θ is θ (M2*e*), the main injection to the cylinder 2 is ended. The crank angle θ (M2*s*) starting the main injection and the crank angle θ (M2*e*) ending the main injection can be obtained based on the engine operating condition, as described above. Δθ (M2*s*) indicates an angular range between the crank angle θ (M2) of a rising portion 14*s* (a start point) of the pulse signal (the tooth portion detection signal) 14 and the crank angle θ (M2*s*) starting the main injection thereof. Δθ (M2*e*) indicates an angular range between the above-described crank angle θ (M2) and the crank angle θ (M2*e*) ending the main injection. These angular ranges Δθ (M2*s*) and Δθ (M2*e*) are standby angular ranges set by using, as a reference point, the crank angle (a reference crank angle) θ (M2) corresponding to the reference tooth portion E14. At step S10, in the example in FIG. 3, the tooth portion detection information of the previous injection cycle is the pulse signals 04 to 13 and 14 in FIG. 2(*b*), and the inter-signal time period detection information of the previous injection cycle is a time period obtained by using the pulse signals 04 to 13 and 14.

In the example in FIG. 3, the pilot injection is started to the cylinder 7 when the crank angle θ is θ (P7*s*), and the pilot injection to the cylinder 7 is ended when the crank angle θ is θ (P7*e*). As described above, the crank angle θ (P7*s*), at which the pilot injection is started, and the crank angle θ (P7*e*), at which the pilot injection is ended, are obtained based on the engine operating condition. Δθ (P7*s*) indicates an angular range between the crank angle θ (P7) of a rising portion of the pulse signal 18 and the crank angle θ (P7*s*), at which the pilot injection is started. Δθ (P7*e*) indicates an angular range between the crank angle θ (P7) and the crank angle θ (P7*e*), at which the pilot injection is ended. At step S10, in the example in FIG. 3, the tooth portion detection information of the previous injection cycle is the pulse signal 08 in FIG. 2(*b*), and the inter-signal time period detection information of the previous injection cycle is a time period obtained by using the pulse signals 08 and 10 adjacent to each other.

When tx≧ to is established at step S5 in FIG. 4, i.e., when the detected tooth portion is the tooth missing portion, the control computer C proceeds to step S6 to reset the count number Mx to 0 and proceeds to step S9. That is, for example, when a rising of a pulse signal 00 corresponding to the tooth portion E00 is detected at step S2, a rising of the previous pulse signal is a rising of the pulse signal 36 corresponding to the tooth missing portion D36. In this case, an affirmative determination is made at step S5, and thus, the count number Mx is reset to zero at step S6. Accordingly, from this point onward, at each time the routine is executed, the count number Mx is incremented by regarding the rising of the pulse signal 01 corresponding to the tooth portion E01 as the first. This means that when the count number Mx is used, the tooth portion can be specified.

At step S9, the control computer C determines whether the reference tooth portion exists in the tooth missing head section in a tooth missing zone. The tooth missing zone is a zone of the signal 36 shown in FIG. 2(*c*), and is equivalent to a zone from a head portion of the tooth missing portion D36 to a head portion of the normal tooth portion E00 positioned subsequent to the tooth missing portion.

In the example in FIG. 2(*c*), the pilot injection to the cylinder 1 is started when the crank angle θ is θ (P1*s*), and the pilot injection to the cylinder 1 is ended when the crank angle θ is θ (P1*e*). As described above, the crank angle θ (P1*s*), at which the pilot injection is started, and the crank angle θ (P1*e*), at which the pilot injection is ended, are obtained based on the engine operating condition. Δθ (Ps) indicates an angular range between the crank angle θ (P) of a rising portion 36*s* of the pulse signal 36 and the crank angle θ (P1*s*), at which the pilot injection is started. Δθ (Pe) indicates an angular range between the crank angle θ (P) and the crank angle θ (P1*e*), at which the pilot injection is ended. These angular ranges Δθ (Ps) and Δθ (Pe) are standby angular ranges set by using, as a reference point, the crank angle θ (P) corresponding to the reference tooth portion E36. θ (P1) is a crank angle when the crank angle θ (P) is used as a reference point, and set backwardly only by a crank angular width (20° in the present embodiment) which is equivalent to the two detection signals of the normal tooth portion. T(P1) is a value in which the crank angle θ (P1) is represented in time units.

When the reference tooth portion exists in the tooth missing head section, the control computer C proceeds to step S8 in FIG. 5.

When the reference tooth portion is not in the tooth missing head section, i.e., when the reference tooth portion is in a section of the tooth missing zone other than the head section (a specific region including the central section and the ending section), the control computer C uses the tooth portion detection information of the previous injection cycle and the following expressions (1) and (2) to calculate the injection start standby time period T(s), at steps S10 to S13 in FIG. 5. First, the control computer C uses the following expression (1) at step S10 to calculate T(h).

[Expression 1]

$$T(h) = \sum_{k=1}^{h} \Delta Tk(k = 1 \sim h) \quad (1)$$

The sign k represents a positive integer. The sign h represents a numerical value indicating to what position of the tooth missing zone the reference tooth portion is set. When the reference tooth portion is set to the tooth missing central section, h=2 is established, and when it is set to the tooth missing ending section, h=3 is established.

In ΔT1 (when k is 1) and ΔT2 (when k is 2), a time period between the tooth portions corresponding to the previous injection cycle is set. That is, ΔT1 becomes a time period (the inter-signal time period) between a signal 26 and a signal 27; ΔT2 becomes a time period (the inter-signal time period) between a signal 27 and a signal 28; and ΔT3 becomes a time period (the inter-signal time period) between a signal 28 and a signal 30. The control computer C stores the measurement information (the inter-signal time period) obtained by the timer 37. After the processing at step S10, the control computer C determines whether k is equal to h at step S11.

When k(≦h) is not equal to h, the control computer C sets k+1 as k at step S12, and proceeds to step S10. When k(≦h) is equal to h, the control computer C uses the following expression (2) at step S13 to calculate T(s).

$$T(s)=T(h)+Ts(h) \quad (2)$$

In the example in FIG. 2(*c*), the injection start standby time period T(s) is TPs. TPe is an injection end standby time period, and is obtained by adding the injection start standby time period to a predetermined fuel injection time period τ determined by the engine operating condition, etc. In the example in FIG. 2(*c*), T(h) is (ΔT1+ΔT2).

In the example in FIG. 2(*c*), the tooth missing portion detection information of the previous injection cycle is pulse signals 26, 27, 28, and 30 in FIGS. 2(*b*) and 2(*c*), and the inter-signal time period detection information of the previous injection cycle is a time period calculated by using the pulse signals 26, 27, 28, and 30.

In the processing at steps S10 to S13, one or more inter-signal time periods between the adjacent signals of the past signals 26, 27, and 28, equivalent to the number of missing teeth obtained by the detection of the tooth portions E26, E27, and E28; and a remaining time period are added. The number of missing teeth is equivalent to a value Z obtained by dividing the crank angular range (30° in the present embodiment) of the signal obtained by the detection of the tooth missing portion D36 by the crank angular width (10° in the present embodiment) of the signal obtained by the detection of the tooth portion. In the present embodiment, the number of missing teeth Z is 3.

The processing at step S8 is that when the fuel injection timing is outside a specific section (a section of the tooth missing zone other than the tooth missing head section), a remaining time shorter than the one inter-signal time period is set as a predetermined standby time period (a fuel injection start standby time period). The processing at steps S10 to S13 are that the tooth portion detection information and the inter-signal time period detection information of the previous injection cycle are used to replace Δθ (Ps) representing a crank angle by Tps representing time units and replace Δθ (Pe) representing a crank angle by TPe representing time units. That is, the processing at steps S10 to S13 are that when the fuel injection timing is in a specific section (a section of the tooth missing zone other than the tooth missing head section), a time period obtained by adding one or more inter-signal time periods to the remaining time period shorter than the one inter-signal time period is set as a predetermined standby time period (the fuel injection start standby time period). T(P) in FIG. 2(*c*) is a reference time in which the crank angle θ (P) is represented in time units.

After the processing at step S8 or step S13, the control computer C determines whether the injection start standby time period T(s) has elapsed from a reference time To at step S14. The reference time To is a reference time T(M2) or a reference time T(P7) in the example in FIG. 3, and is the reference time T(P) in the example in FIG. 2(*c*). When the injection start standby time period T(s) has elapsed from the reference time To, the control computer C proceeds to step S15 to cause a corresponding fuel injection nozzle to start the fuel injection. In the example in FIG. 2(*c*), the fuel injection nozzle 141 of the cylinder 1 is caused to start the fuel injection (pilot injection). Subsequently, at step S16, the control computer C determines whether the predetermined time period τ has elapsed from the time To+T(s). The predetermined time period τ is a fuel injection period set from the operating condition of the engine, etc. A time period T(s)+τ is the fuel injection end standby time period as a predetermined standby time period. When the predetermined time τ has elapsed from the time To+T(s), the control computer C proceeds to step S17 to cause a corresponding fuel injection nozzle to end the fuel injection. In the example in FIG. 2(*c*), the fuel injection nozzle 141 of the cylinder 1 is caused to end the fuel injection (pilot injection). Thereafter, the control computer C proceeds to step S1.

Subsequently, a second embodiment according to the present invention will be described with reference to FIGS. 2(*a*), 2(*b*) and 2(*c*) and FIGS. 6 to 9. In the second embodiment, an apparatus configuration and the manner in which fuel injection is executed are the same as those in the first embodiment. Since steps S1 to S6 in a flowchart in FIG. 6 are the same as steps S1 to S6 in the flowchart in the first embodiment, the description is omitted.

Figure 6:
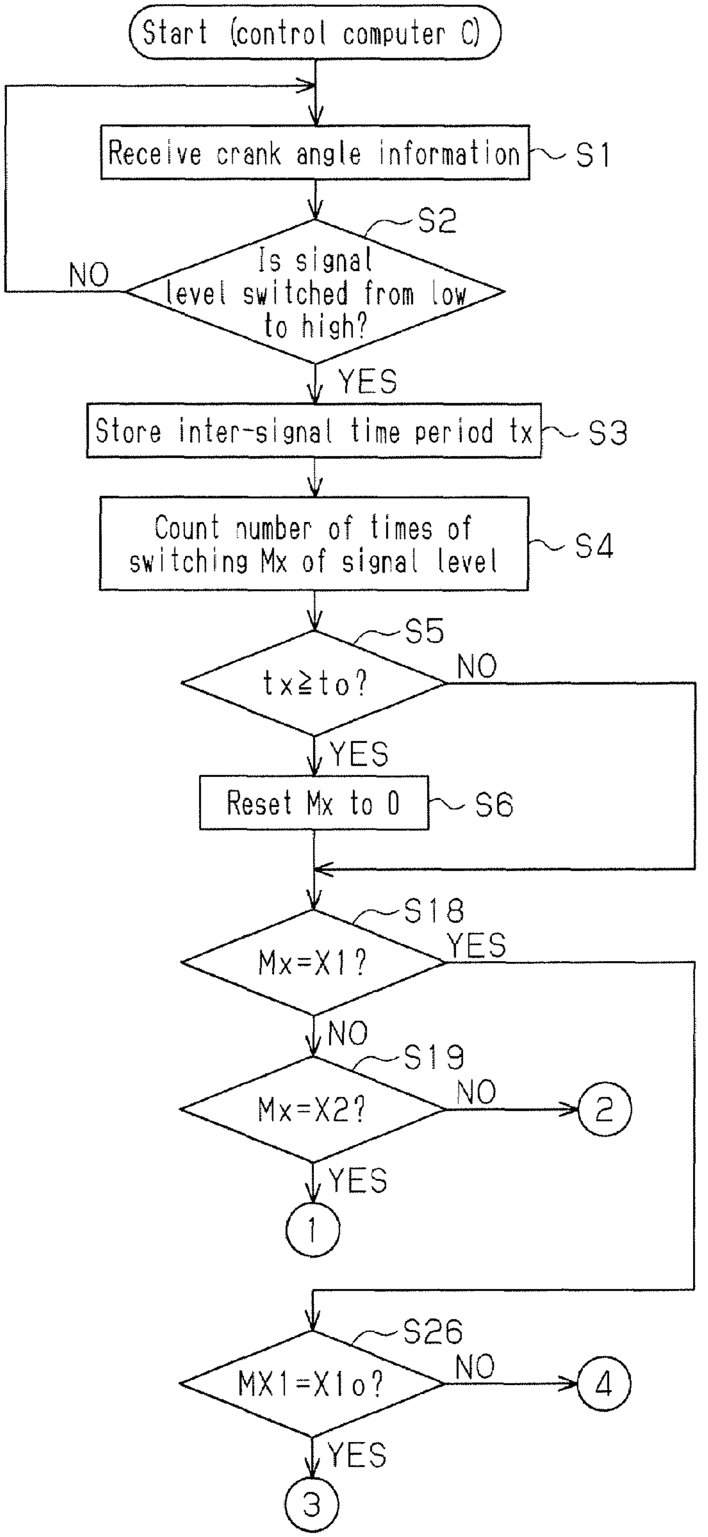
FIG. 6 is a flowchart showing a fuel injection control procedure according to a second embodiment.

As shown in FIG. 6, when the tooth missing portion D36 is not detected at step S5 or when the count number Mx is reset to zero at step S6, the control computer C determines at step S18 whether the count number Mx is a previously set value X1. In the present embodiment, a case in which the value X1 is any one of 9, 18, 27, and 0 is described as an example. As shown in FIG. 2(*b*), the pilot injection starts within a width of the pulse signals 08, 18, and 28 corresponding to the count numbers Mx of 8, 17, and 26, each of which numbers is smaller by one than these values X1 of 9, 18, and 27. The pulse signals 08, 18, and 28 can be obtained as a result of the corresponding tooth portions E08, E18, and E28 detected. The respective tooth portions E08, E18, and E28 are defined as reference tooth portions of the injection timing of the pilot injections P2, P7, P3, P5, P6, and P8. When the tooth missing portion D36 is detected at step S5, the count number Mx is reset to zero from 34 at step S6, and it is determined that the count number Mx is the value X1 of zero at step S18. In this case, the pilot injection starts within the width of the pulse signal 36 corresponding to the count number Mx of 33 of which the number is smaller by one than a value of 34 which is a value before being reset to zero. The pulse signal 36 is obtained as a result of the tooth missing portion D36 detected. The tooth missing portion D36 is defined as the reference tooth portion of the injection timing of the pilot injections P1 and P4.

When the count number Mx is not the value X1 at step S18, the control computer C proceeds to step S19 to determine whether the count number Mx is a previously set value X2. In the present embodiment, the value X2 is obtained by the following expression. It is noted that n is an integer of 1 to 4.

$$X2=5+9\times(n-1)$$

The value X2 obtained by this expression is specifically any one of 5, 14, 23, and 32. As shown in FIG. 2(*b*), the main injection starts within a width of the pulse signals 04, 14, 24, and 34 corresponding to the count number Mx of 4, 13, 22, and 31, each of which number is smaller by one than the values X2 of 5, 14, 23, and 32. The pulse signals 04, 14, 24, and 34 are obtained as a result of the corresponding tooth portions E04, E14, E24, and E34 detected. The tooth portions E04, E14, E24, and E34 are defined as the reference tooth portions of the injection timing of the main injections M1 to M8.

Figure 7:
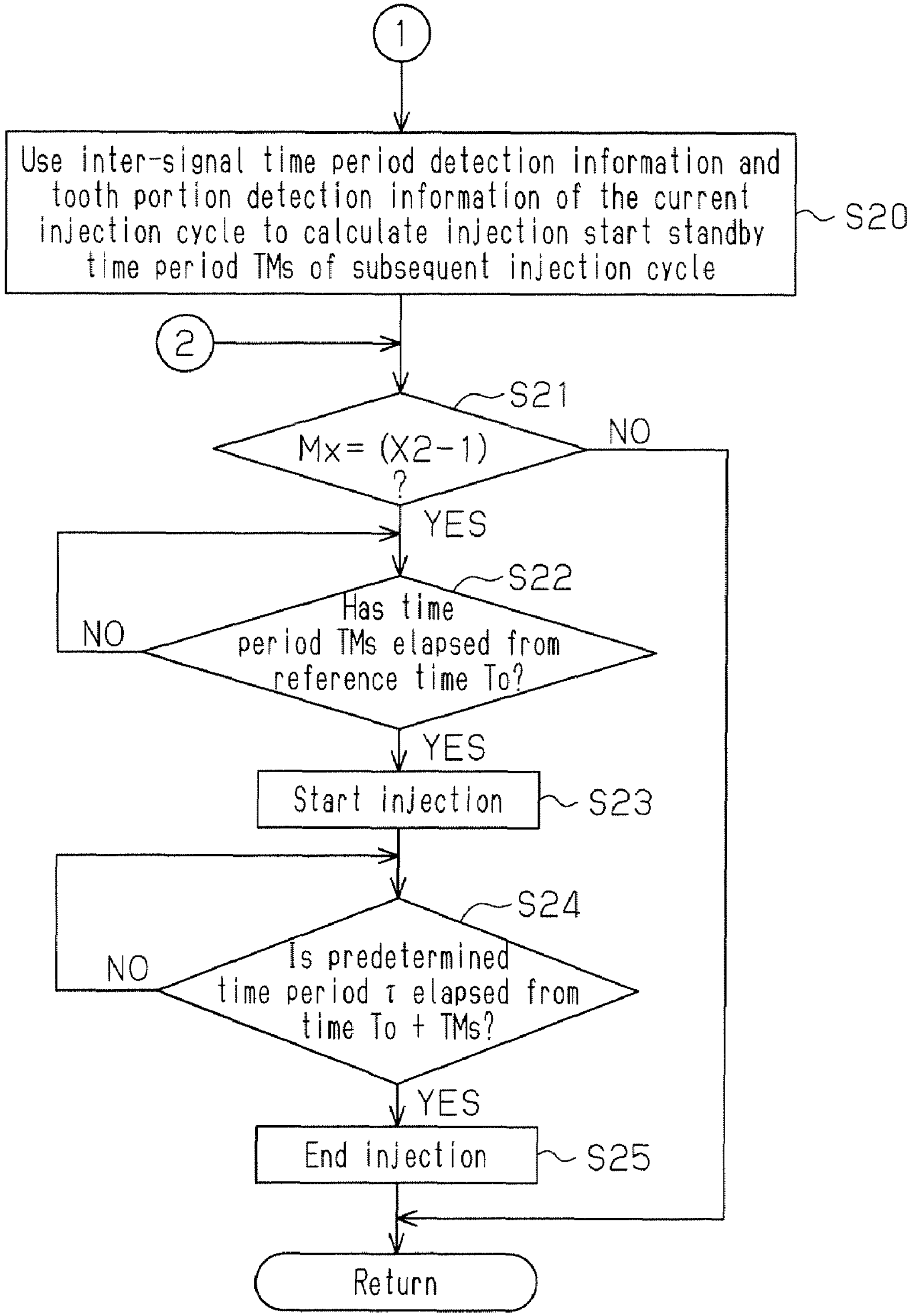
FIG. 7 is a flowchart showing the fuel injection control procedure according to the second embodiment.
Figure 8:
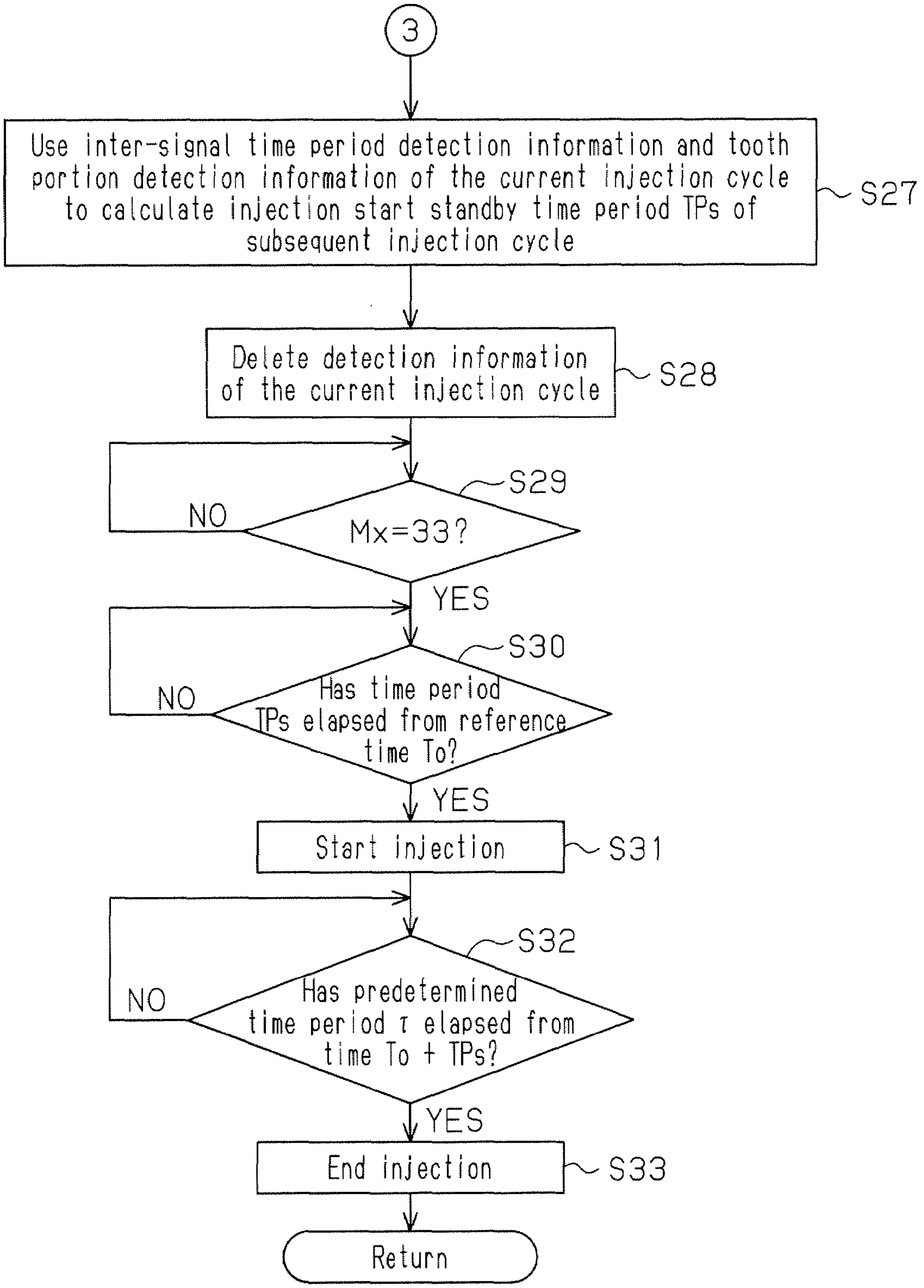
FIG. 8 is a flowchart showing the fuel injection control procedure according to the second embodiment.

When the count number Mx is the value X2 at step S19, the control computer C proceeds to step S20 in FIG. 7 and uses the tooth portion detection information and the inter-signal time period detection information of the current injection cycle to calculate the injection start standby time period TMs of a subsequent injection cycle.

At step S20, the control computer C uses the tooth portion detection information and the inter-signal time period detection information of the current injection cycle to replace the standby angular range in the subsequent injection cycle by the duration. Specifically, in the example in FIG. 3, the standby angular range Δθ (M2*s*) is replaced by the injection start standby time period TM2*s*. T(M2) in FIG. 3 is the reference time To obtained by replacing the crank angle (the reference crank angle) θ (M2) corresponding to the reference tooth portion E14 by representation in time units.

After the processing at step S20, the control computer C determines whether the count number Mx is a previously set value (X2−1) at step S21. The value (X2−1) is specifically any one of 4, 13, 22, and 31. When the count number Mx is not the value (X2−1), the control computer C proceeds to step S1.

In contrast, when the count number Mx is the value (X2−1) at step S21, the control computer C proceeds to step S22 to determine whether the injection start standby time period TMs has elapsed from the reference time To. The reference time To is the reference time T(M2) in the example in FIG. 3. When the injection start standby time period TMs has elapsed from the reference time To, the control computer C proceeds to step S23 to cause a corresponding fuel injection nozzle to start the fuel injection. In the example in FIG. 3, the fuel injection nozzle 142 of the cylinder 2 is caused to start the fuel injection (main injection). Subsequently, at step S24, the control computer C determines whether the predetermined time period τ has elapsed from the time To+TMs. When the predetermined time period τ has elapsed from the time To+TMs, the control computer C proceeds to step S25 to cause a corresponding fuel injection nozzle to end the fuel injection. In the example in FIG. 3, the fuel injection nozzle 142 of the cylinder 2 is caused to end the fuel injection (main injection). Thereafter, the control computer C proceeds to step S1.

In contrast, when the count number Mx is not the value X2 at step S19 in FIG. 6, the control computer C proceeds to step S21 in FIG. 7.

In addition, when the count number Mx is the value X1 at step S18 in FIG. 6, the control computer C proceeds to step S26 to determine whether the count number Mx is a previously set value X1*o*. In the present embodiment, the value X1*o* is 27. When the count number Mx is the value X1*o*, the control computer C proceeds to step S27 in FIG. 8 and uses the tooth missing portion detection information and the inter-signal time period detection information of the current injection cycle to calculate an injection start standby time period TPs of a subsequent pilot injection.

At step S27, the control computer C uses the tooth portion detection information and the inter-signal time period detection information of the current injection cycle to replace the standby angular range in the subsequent injection cycle by the duration. Specifically, in the example in FIG. 2(*c*), the standby angular range Δθ (Ps) is replaced by the injection start standby time period TPs. T(P) in FIG. 2(*c*) is the reference time To obtained by replacing the crank angle (the reference crank angle) θ (P) corresponding to the reference tooth portion E14 by the representation in time units. The time period TPs can be represented by the following expression (3), where ΔT1 denotes an inter-signal time period detected based on the adjacent signals 26 and 27; ΔT2 denotes an inter-signal time period detected based on the adjacent signals 27 and 28; and ΔT3 denotes an inter-signal time period detected based on the adjacent signals 28 and 30.

$$TPs=\Delta T1+\Delta T2+TP1s=\Delta T1+\Delta T2+\Delta\theta\ (P1s)\times\Delta T3/10° \quad (3)$$

A rotational speed V of the signal rotor 31 corresponding to the signal 28 is represented by the following expression (4):

$$V=\Delta\theta\ (P1s)/TP1s=10°/\Delta T3 \quad (4)$$

TP1*s* is obtained from the expression (4), and thereby, the expression (3) is obtained.

The control computer C uses the expression (3) to calculate the standby time period TPs.

After processing at step S27, the control computer C deletes the detection information (the inter-signal time period information, the tooth portion detection information, and the tooth missing portion detection information) of the current injection cycle at step S28.

After processing at step S28, the control computer C proceeds to step S29 to determine whether the count number Mx is 33. When the count number Mx is 33, the control computer C proceeds to step S30 to determine whether the injection start standby time period TPs has elapsed from the reference time To. When the injection start standby time period TPs has elapsed from the reference time To at step S30, the control computer C proceeds to step S31 to cause the fuel injection nozzle (in the example shown in FIG. 2(*c*), the fuel injection nozzle 141 of the cylinder 1) to start the fuel injection. Subsequently, at step S32, the control computer C determines whether the predetermined time period τ has elapsed from the time To+TPs. When the predetermined time period τ has elapsed from the time To+TPs, the control computer C proceeds to step S33 to cause a corresponding fuel injection nozzle to end the fuel injection. In the example in FIG. 2(*c*), the fuel injection nozzle 141 of the cylinder 1 is caused to end the fuel injection (pilot injection). Thereafter, the control computer C proceeds to step S1.

Figure 9:
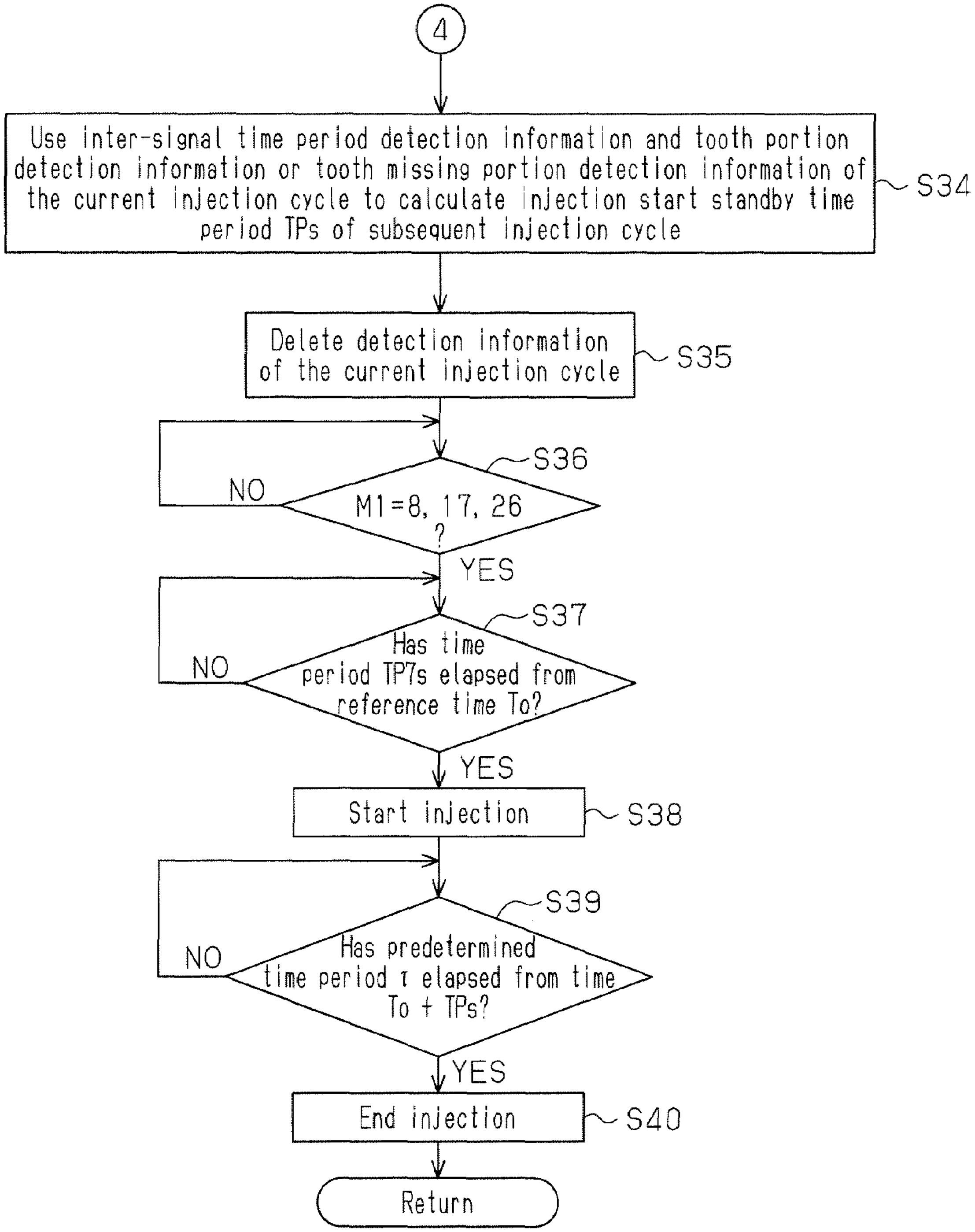
FIG. 9 is a flowchart showing the fuel injection control procedure according to the second embodiment.

When the count number Mx is not the value X1*o* at step S26 in FIG. 6, i.e., when the count number Mx is any one of 9, 18, and 0, the control computer C proceeds to step S34 in FIG. 9 and uses the tooth portion detection information and inter-signal time period detection information of the current injection cycle to calculate the injection start standby time period TPs of the pilot injection in the subsequent injection cycle.

At step S34, the control computer C uses the tooth portion detection information and the inter-signal time period detection information of the current injection cycle to replace the standby angular range in the subsequent injection cycle by the duration. Specifically, in the example in FIG. 3, the standby angular range Δθ (P7*s*) is replaced by the injection start standby time period TP7*s*. T(P7) in FIG. 3 is the reference time To obtained by replacing the crank angle (the reference crank angle) θ (P7) by the representation in time units.

After processing at step S34, the control computer C deletes the detection information (the inter-signal time period detection information and the tooth portion detection information) of the current injection cycle at step S35.

After the processing at step S35, the control computer C proceeds to step S36 to determine whether the count number Mx is any one of 8, 17, and 26. When the count number Mx is any one of 8, 17, and 26, the control computer C proceeds to step S37 to determine whether the injection start standby time period TPs has elapsed from the reference time To. The reference time To is the reference time T(P7) in the example in FIG. 3. When the injection start standby time period TPs has elapsed from the reference time To, the control computer C proceeds to step S38 to cause the fuel injection nozzle (in the example shown in FIG. 3, the fuel injection nozzle 147) to start the fuel injection (pilot injection). Subsequently, at step S39, the control computer C determines whether the predetermined time period τ has elapsed from the time To+TPs. When the predetermined time period τ has elapsed from the time To+TPs, the control computer C proceeds to step S40 to cause a corresponding fuel injection nozzle to end the fuel injection. In the example in FIG. 3, the fuel injection nozzle 147 of the cylinder 7 is caused to end the fuel injection (pilot injection). Thereafter, the control computer C proceeds to step S1.

When the fuel injection timing is outside the specific section, the control computer C in the first and second embodiments sets, to the predetermined standby time period, the remaining time period shorter than the one inter-signal time period. When the fuel injection timing is in the specific section, the control computer C sets, to the predetermined standby time period, the time period obtained by adding one or more inter-signal time periods to the remaining time period shorter than the one inter-signal time period.

The following advantages are obtained in the first and second embodiments.

(1) The injection timing of the pilot injection of which the injection timing is set within a width of the detection signal 36 of the tooth missing portion D36 is set by using the inter-signal time periods ΔT1, ΔT2, and ΔT3, and the remaining time period Ts(h). The inter-signal time periods ΔT1, ΔT2, and ΔT3, and the remaining time Ts(h) are set by using the past signals 26, 27, 28, and 30 older than the signal 36 obtained by the detection of the tooth missing portion D36. The adoption of such signals 26, 27, 28, and 30 enables the appropriate calculation of the injection timing set within the width of the detection signal 36 of the tooth missing portion D36.

(2) The past pulse signals obtained by the detection of the tooth portions E26, E27, E28, and E30 are those obtained in the injection cycle one before the injection cycle performing the current fuel injection. For example, when the main injection M8 or the pilot injection P1 is the current fuel injection, the current injection cycle is equivalent to the angular range extending between TDC8 and TDC1, and the previous injection cycle is equivalent to the angular range extending between TDC6 and TDC8. The rotational speed obtained from the past pulse signal coincides precisely with the rotational speed in the injection cycle performing the current fuel injection. Accordingly, the past pulse signal obtained in the injection cycle one before the injection cycle performing the current fuel injection is suitable for calculating the main injection timing and the pilot injection timing.

(3) The greater the total number of cylinders, the more likely that the fuel injection timing is set within the width of the detection signal of the tooth missing portion. An 8-cylinder internal combustion engine having many cylinders is suitable for the application of the present invention.

The present invention may be embodied in the following modes.

The following expression (5) may be used to obtain the standby time period TPs, and the following expression (6) may be used to obtain the standby time period TPe. ΔTk is any one of ΔT1, ΔT2, and ΔT3.

$$TPs=\Delta\theta\ (Ps)\times(\Delta Tk)/10° \qquad (5)$$

$$TPe=\Delta\theta\ (Pe)\times(\Delta Tk)/10° \qquad (6)$$

A rotational speed V is represented by the following expressions (7) and (8), where V denotes a rotational speed of the signal rotor 31:

$$V=\Delta\theta\ (Ps)/TPs=10°/\Delta Tk \qquad (7)$$

$$V=\Delta\theta\ (Pe)/TPe=10°/\Delta Tk \qquad (8)$$

The expression (5) is obtained from the expression (7), and the expression (6) is obtained from the expression (8).

A pulse signal obtained in an injection cycle of two or more cycles before the injection cycle performing the current fuel injection may be used for calculating the injection timing.

A signal of two or more cycles before the detection signal of the tooth portion obtained this time may be used for calculating the injection timing.

A post-injection is sometimes performed after the main injection. However, even when the injection timing of the post-injection is set within the width of the signal obtained by the detection of the tooth missing portion, the present invention may be applied to this case.

When the injection timing is calculated by using the past pulse signal obtained by the detection of the tooth missing portion, the present invention may be applied to internal combustion engines of other than 8 cylinders (for example, 4, 6, 10, and 12 cylinders).

In the above-described embodiments, only one tooth missing portion is formed in the signal rotor. However, a plurality of tooth missing portions may be formed. For example, two tooth missing portions may be formed at spacing of 180°.

The invention claimed is:

1. A fuel injection control apparatus in an internal combustion engine having a plurality of cylinders, comprising:

a fuel injection device for injecting fuel into the cylinders;

a crank angle detector including a signal rotor, the signal rotor having: a plurality of tooth portions aligned along a circumferential direction with constant angular spacing; and a tooth missing portion arranged over an angular range larger than alignment spacing of the tooth portions, wherein the crank angle detector, in accordance with a rotation of the signal rotor, outputs a signal corresponding to each tooth portion and a signal corresponding to the tooth missing portion;

a timer for measuring an inter-signal time period, which is a time period from when the crank angle detector outputs the signal corresponding to the tooth portion to when the crank angle detector outputs a signal corresponding to a subsequent tooth portion; and a control unit which uses the signal outputted from the crank angle detector to obtain a fuel injection timing, and according to the obtained fuel injection timing, causes the fuel injection device to start a fuel injection, wherein the control unit defines a reference tooth portion out of the tooth portions and the tooth missing portion, and sets, as the fuel injection timing, a point of time at which a predetermined standby time period has elapsed from a point of time at which the reference tooth portion is detected, wherein the control unit recognizes a tooth missing zone based on the signal corresponding to the tooth missing portion and determines whether the fuel injection timing is set in a specific section that is the tooth missing zone other than a head section, and wherein, when the fuel injection timing is set in a section other than the specific section, the control unit sets, as the predetermined standby time period, a remaining time period shorter than one inter-signal time period, and wherein, when the fuel injection timing is set in the specific section, the control unit sets, as the predetermined standby time, a time period obtained by adding one or more inter-signal time periods to the remaining time period.

2. The apparatus according to claim 1, wherein the head section is equivalent to a section of one piece of a normal tooth portion from a leading end of the tooth missing portion.

3. The apparatus according to claim 1, wherein, when a fuel injection to each cylinder is regarded as one injection cycle, the control unit repeats execution of the injection cycle, and the reference tooth portion is set as a u-th (u is a positive integer) tooth portion in tooth portion detection information obtained in the injection cycle corresponding to an m-th (m is a positive integer) cylinder.

4. The apparatus according to claim 1, wherein, when the fuel injection to each cylinder is regarded as one injection cycle, the control unit repeats execution of the injection cycle, and the control unit uses a signal obtained in the injection cycle one before the current injection cycle to calculate the predetermined standby time period in the current injection cycle.

5. The apparatus according to claim 1, wherein the number of the cylinders is six or more.

* * * * *